US005745345A

United States Patent [19]
Deguchi

[11] Patent Number: 5,745,345
[45] Date of Patent: Apr. 28, 1998

[54] PORTABLE INFORMATION APPARATUS WHICH IS CONSIDERABLY SMALL IN SIZE AND IN THICKNESS WHEN A CARD IS DISCONNECTED THEREFROM

[75] Inventor: Manabu Deguchi, Tokyo, Japan

[73] Assignee: NEC Corporation, Tokyo, Japan

[21] Appl. No.: 650,858

[22] Filed: May 20, 1996

[30] Foreign Application Priority Data

May 18, 1995 [JP] Japan .................................... 7-120159

[51] Int. Cl.$^6$ ........................................... H05K 1/14
[52] U.S. Cl. ........................... 361/741; 361/737; 361/756; 361/802; 439/131
[58] Field of Search .................................. 361/683–686, 361/724–727, 737, 740–741, 747, 756, 759, 798, 802; 235/492; 439/137, 132, 64, 377

[56] References Cited

U.S. PATENT DOCUMENTS

| 5,183,404 | 2/1993 | Aldous et al. .............................. 439/55 |
| 5,338,210 | 8/1994 | Beckham et al. ......................... 439/131 |
| 5,572,402 | 11/1996 | Jeong ....................................... 361/685 |

FOREIGN PATENT DOCUMENTS

| 4-155415 | 5/1992 | Japan ................................. G06F 1/16 |
| 2267999 | 12/1993 | United Kingdom . |
| 2269713 | 2/1994 | United Kingdom . |
| 2295281 | 5/1996 | United Kingdom . |

Primary Examiner—Leo P. Picard
Assistant Examiner—Phuong T. Vu
Attorney, Agent, or Firm—Sughrue, Mion, Zinn, Macpeak & Seas, PLLC

[57] ABSTRACT

In a portable information apparatus having a card connector (1) for connecting a card (10) such as an IC card, a connector holding member (3) and a pair of guide members (4) are movable between both sides of a principal surface (2a) of a case member (2). The card is used for expanding function of the portable information apparatus. The connector holding member is for holding the card connector. The guide members are for guiding the card in parallel to the principal surface. When the connector holding member (3) and the guide members (4) are placed at one side of the principal surface (2a) to protrude outwardly from the case member (2), it is possible to connect the card (10) with the card connector (1). When the card (10) is not used, the connector holding member (3) and the guide members (4) are placed at another side of the principal surface (2a).

15 Claims, 6 Drawing Sheets

PORTABLE INFORMATION APPARATUS WHICH IS CONSIDERABLY SMALL IN SIZE AND IN THICKNESS WHEN A CARD IS DISCONNECTED THEREFROM

BACKGROUND OF THE INVENTION

This invention relates to a portable information apparatus and, in particular, to a portable information apparatus to which a card can be connected for expanding function of the portable information apparatus. The card may be an IC card known in the art.

In a conventional portable information apparatus, a particular function is often desired in addition to standard functions. For example, the particular function is one of a communication function, an additional memory function, and so on. In most cases, the particular function is achieved by the use of an IC card.

The conventional portable information apparatus comprises a case member having a side surface provided with a card slot for receiving the IC card. The conventional portable information apparatus further comprises a connector inside a case member. When inserted into the card slot, the IC card is connected to the connector. Thus, the conventional portable information apparatus is connected to the IC card through the connector.

Since the portability is a key point in sales promotion, the portable information apparatus of the type described is strongly desired to be small in size and in thickness. Research and development are focused upon miniaturization of various electrical parts and reduction in thickness of the case member.

However, the conventional portable information apparatus is relatively large in size and in thickness. This is because the case member has a card receiving space even when the IC card is not received therein. In this case, the card receiving space is useless. This constitutes one of those factors which inhibit reduction in size and in thickness of the portable information apparatus.

SUMMARY OF THE INVENTION

It is therefore an object of this invention to provide a portable information apparatus which is considerably small in size and in thickness when a card is not connected thereto.

Other objects of this invention will become clear as the description proceeds.

According to this invention, there is provided a portable information apparatus comprising a case member having a principal surface, a card connector for connecting a card which is placed parallel to the principal surface for expanding a function of the portable information apparatus, and a connector holding member held to the case member for holding the card connector. The connector holding member is movable between both sides of the principal surface. The portable information apparatus further comprises card guiding means connected to the case member for guiding the card in parallel to the principal surface. The card guiding means is movable between both sides of the principal surface.

DESCRIPTION OF THE PREFERRED EMBODIMENT

In order to facilitate an understanding of this invention, a conventional portable information apparatus will at first be described.

Figure 1:
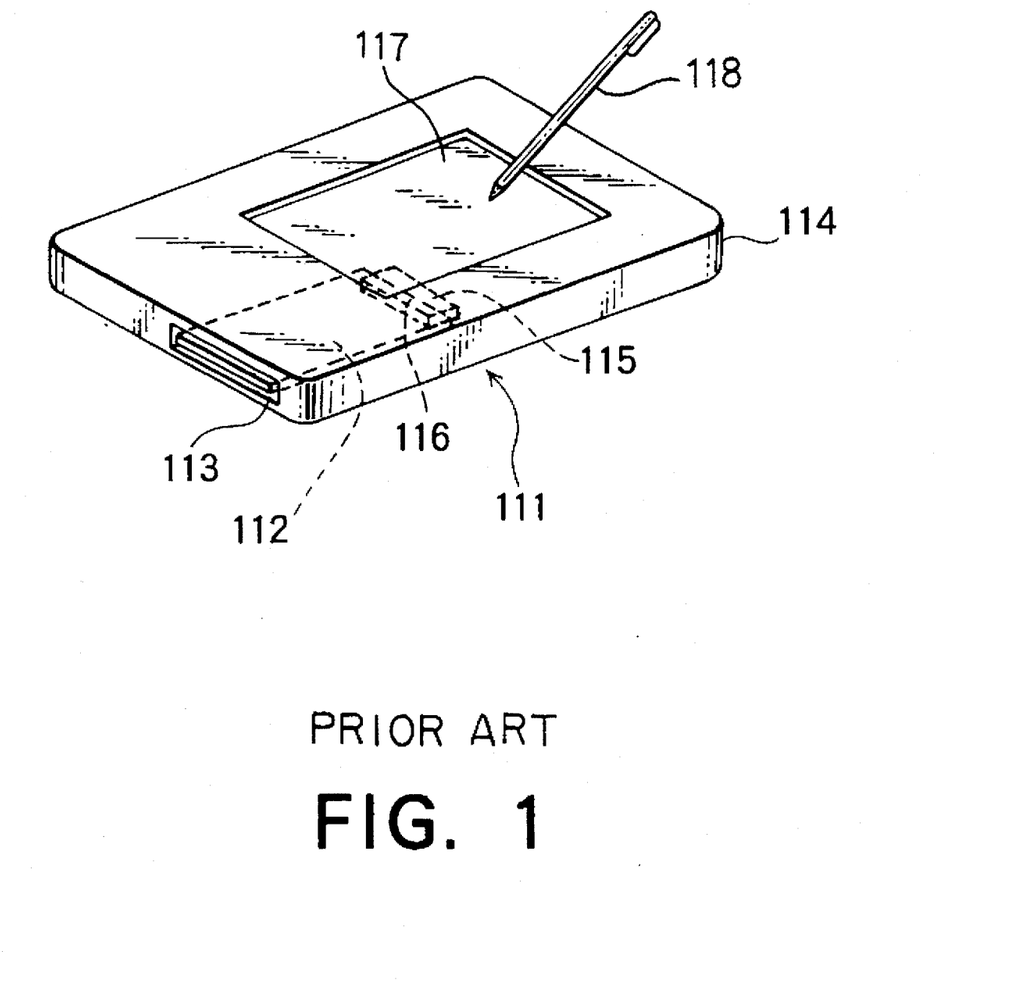
FIG. 1 is a perspective view of a conventional portable information apparatus.

Referring to FIG. 1, a conventional portable information terminal 111 as the conventional portable information apparatus is provided with a card slot 113 formed at its side surface for receiving a card, namely, an IC card 112 inside a case member 114. The IC card 112 is known in the art and is used for expanding a function of the portable information terminal 111. The case member 114 has a connector 115 formed inside to be connected to a mating connector 116 of the IC card 112. Thus, the conventional portable information terminal 111 has an IC card receiving space inside the case member 114.

Furthermore, the conventional portable information terminal 111 comprises a display unit 117 for displaying information in the manner known in the art. An operating rod 118 can be used to input information into the conventional portable information terminal in the manner known in the art.

As described, in the conventional portable information terminal 111 illustrated in FIG. 1, the IC card 112 is received inside the case member. When the IC card 112 is not received therein, the IC card receiving space is useless. This constitutes one of those factors which inhibit reduction in size and in thickness of the portable information terminal 111.

Returning to FIGS. 2 through 4, description will now be made as regards a portable information apparatus according to an embodiment of this invention. A portable information terminal 14 as the portable information apparatus comprises a case member 2, a card connector 1, a connector holding member 3, and a pair of guide members 4. The case member 2 comprises a top plate 12, a bottom plate 13 opposite to the top plate 12, and four side plates 11a, 11b, 11c, and 11d each of which is connected between the top plate 12 and the bottom plate 13. In the case member 2, the top plate 12 has an upper surface or a principal surface 2a. The bottom plate 13 is provided with a display unit (not shown) which is similar to the display unit of the conventional portable information terminal that is described in conjunction with FIG. 1.

Figure 2:
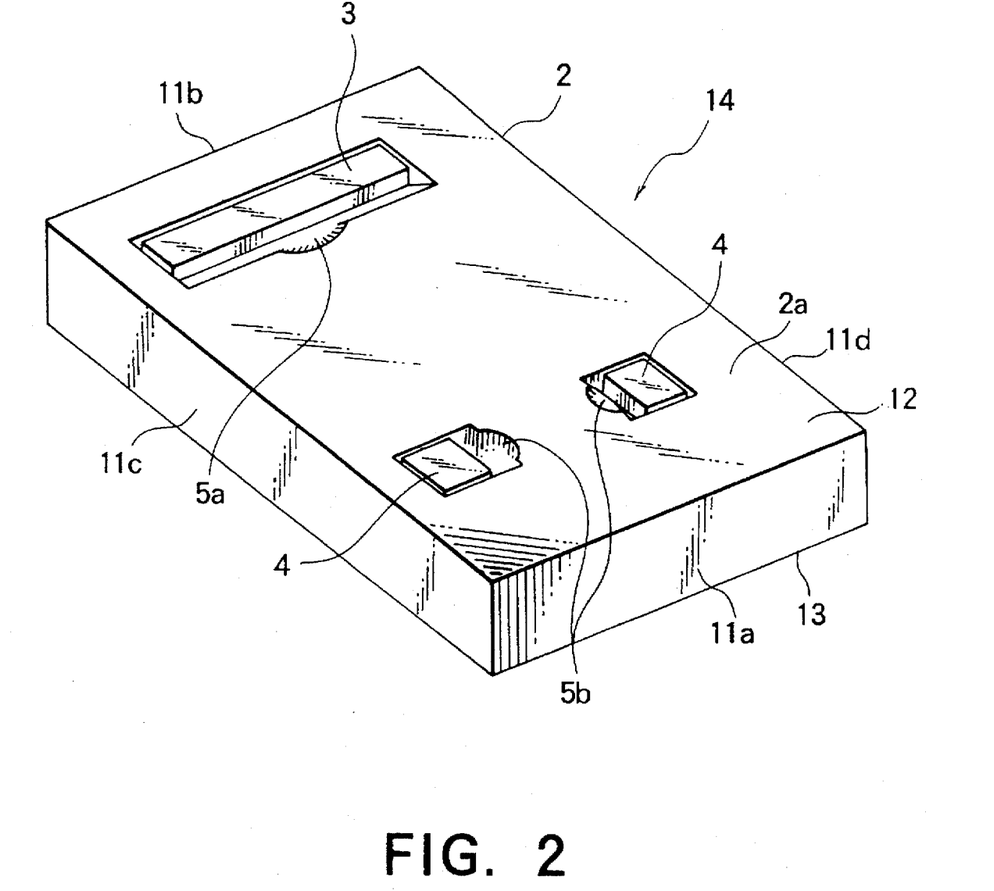
FIG. 2 is a perspective view of a portable information apparatus according to an embodiment of this invention.

The card connector 1 is used for connecting a card, namely, an IC card 10 which is placed parallel to the principal surface 2a. The IC card 10 is for expanding a function of the portable information terminal 14 and is similar to the IC card 112 illustrated in FIG. 1. The card connector 1 will later be described in detail.

The connector holding member 3 is held to the case member 2 and is for holding the card connector 1. In the manner which will later become clear, the connector holding member 3 is movable between both sides of the principal surface 2a.

The guide members 4 are held or connected to the case member 2 and are for guiding the IC card 10 in parallel to the principal surface 2a. In the manner which will later become clear, each of the guide members 4 is movable between both sides of the principal surface 2a. The guide members 4 serve as a card guiding arrangement in cooperation with one another.

Figure 5:
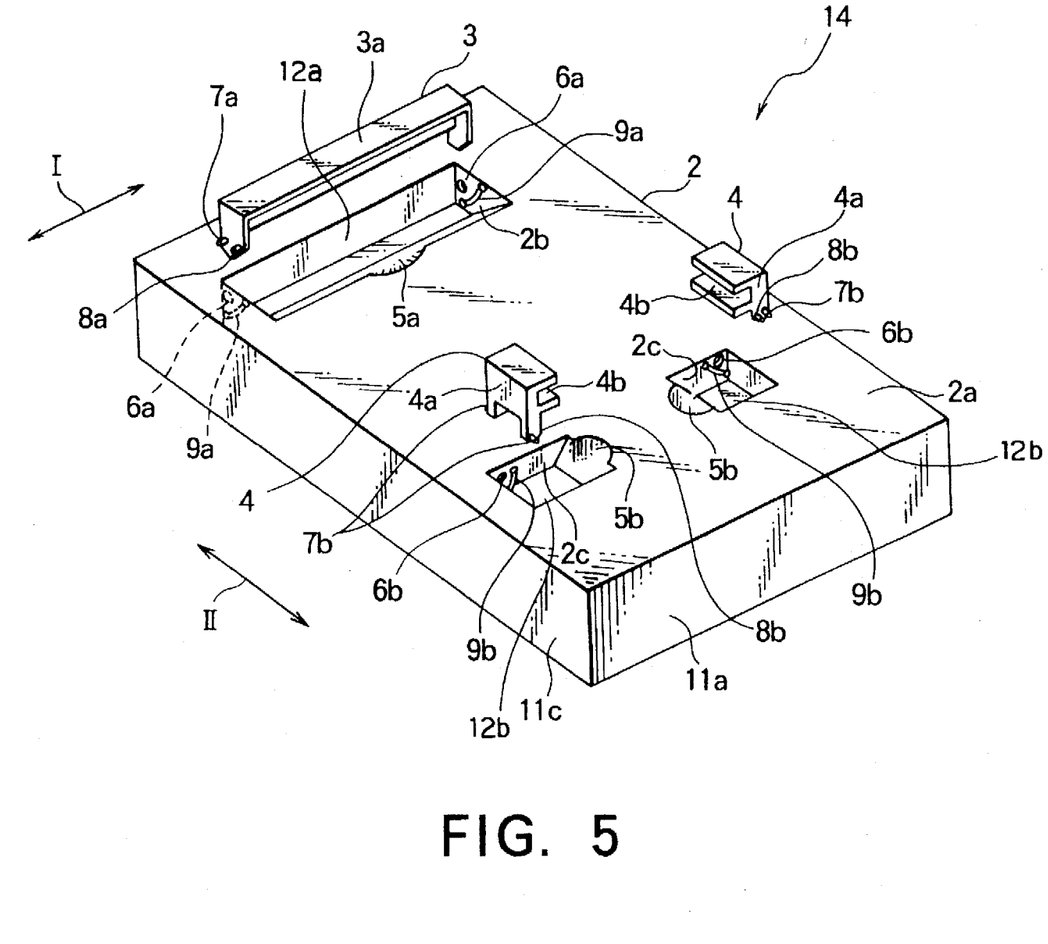
FIG. 5 is an exploded perspective view for describing the portable information apparatus of FIG. 2.

Referring to FIG. 5 in addition, the description will proceed further. The connector holding member 3 comprises a holding body 3a, a pair of holding member axle portions 7a, and a pair of holding member protrusions 8a. The holding body 3a is for receiving or holding the card connector 1. The holding member axle portions 7a extend from opposite ends of the holding body 3a, respectively, along a first axis, extending in a first direction I which is parallel to the principal surface 2a. The holding member protrusions 8a protrude from the opposite ends of the holding body 3a in parallel to each of the holding member axle portions 7a, respectively.

The case member 2 comprises a pair of first wall surfaces 2b opposite to each other in the first direction I, a pair of holding member axle receiving holes 6a on the first surfaces 2b, and a pair of holding member restricting grooves 9a on the first wall surface 2b. The first wall surfaces 2b are opposite to the opposite ends of the holding body 3a in the first direction I, respectively. The holding member axle receiving holes 6a are formed on the first wall surfaces 2b and are for receiving the holding member axle portions 7a, respectively. The holding member restricting grooves 9a are formed on the first wall surfaces 2b and are for receiving the holding member protrusions 8a to restrict the movement of the holding member protrusions 8a, respectively.

With this structure, the connector holding member 3 is movable or rotatable around the first axis. More particularly, the connector holding member 3 is rotatable by 90 degrees with respect to the case member 2 with the movement of the holding member protrusions 8a along the holding member restricting grooves 9a. As a result, the connector holding member 3 is movable between both sides of the principal surface 2a.

The IC card 10 has a pair of card side edges 10a opposite to each other. Each of the guide members 4 comprises a receiving body 4a, a pair of guide member axle portions 7b and a pair of guide member protrusions 8b. The receiving body 4a is for receiving the IC card 10. More particularly, the receiving body 4a has an insertion groove 4b for receiving one of the card side edges 10a to guide the IC card 10 in parallel to the principal surface 2a. The guide member axle portions 7b extend from opposite ends of the receiving body 4a along a second axis, respectively, extending in a second direction II which is parallel to the principal surface 2a and perpendicular to the first direction I. The guide member protrusions 8b protrude from the opposite ends of the receiving body 4a in parallel to the guide member axle portions 7b, respectively.

The case member 2 comprises two pairs of second wall surfaces 2c opposite to each other in the second direction II, a pair of guide member axle receiving holes 6b on the second wall surfaces 2c, and a pair of guide member axle receiving grooves 9b on the second wall surfaces 2c. The second wall surfaces 2c of each pair are opposite to each other in the second direction II and are opposite to the opposite ends of each of the guide members 4. The guide member axle receiving holes 6b are formed on the second wall surfaces 2c of each pair and are for receiving the guide member axle portions 7b, respectively. The guide member restricting grooves 9b are formed on the second wall surfaces 2c of each pair and are for receiving the guide member protrusions 8b to restrict the movement of the guide member protrusions 8b, respectively.

With this structure, each of the guide members 4 is movable or rotatable around the second axis. More particularly, the guide members 4 are rotatable by 90 degrees with respect to the case member 2 with the movement of the guide member protrusions 8b along the guide member restricting grooves 9b. As a result, each of the guide members 4 is movable between both sides of the principal surface 2a. It is noted that the guide members 4 are symmetrically arranged with their rotation axes perpendicular to a rotation axis of the connector holding member 3.

Figure 3:
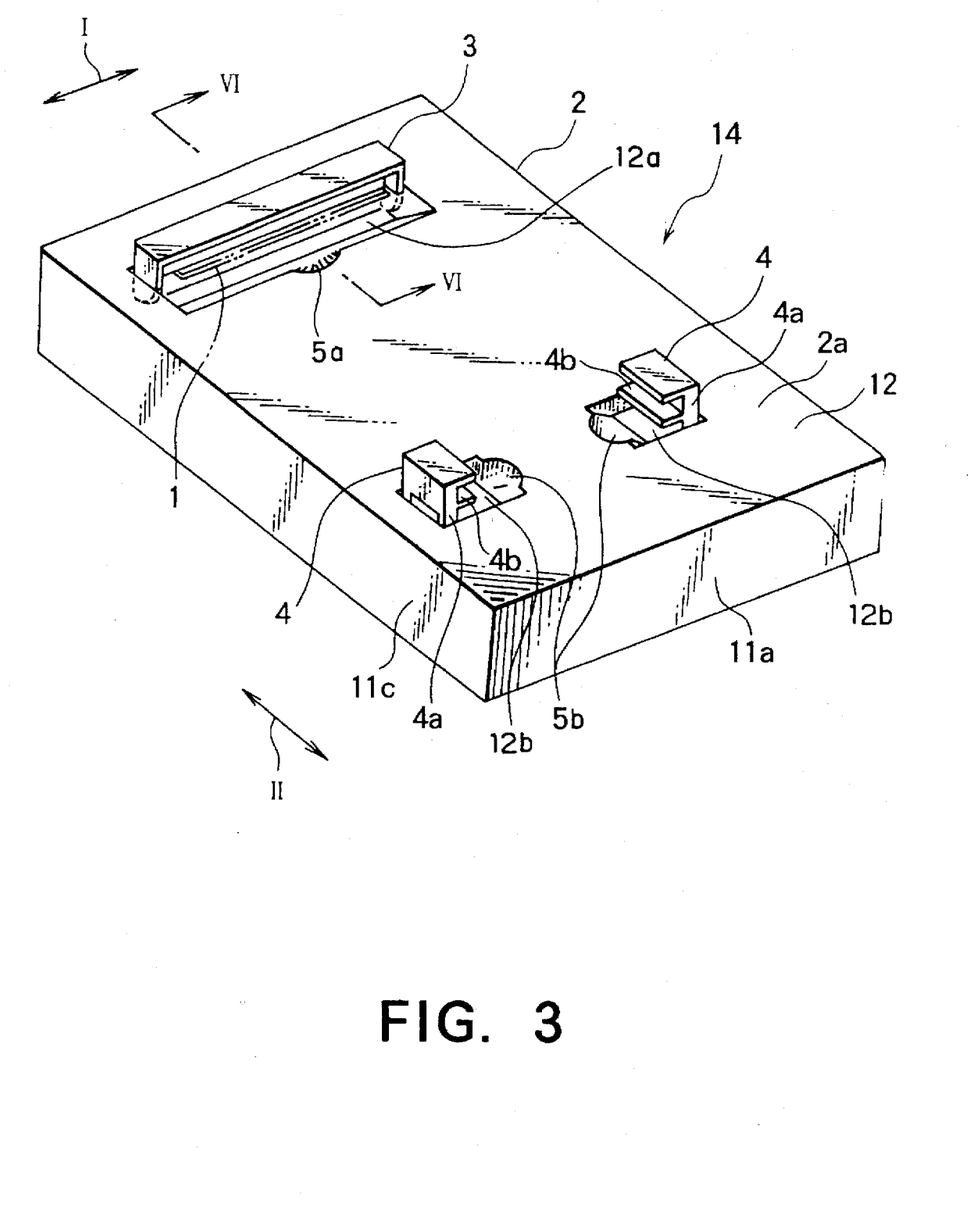
FIG. 3 is a perspective view of the portable information apparatus of FIG. 2, wherein preparation is made for attaching a card to the portable information apparatus.
Figure 4:
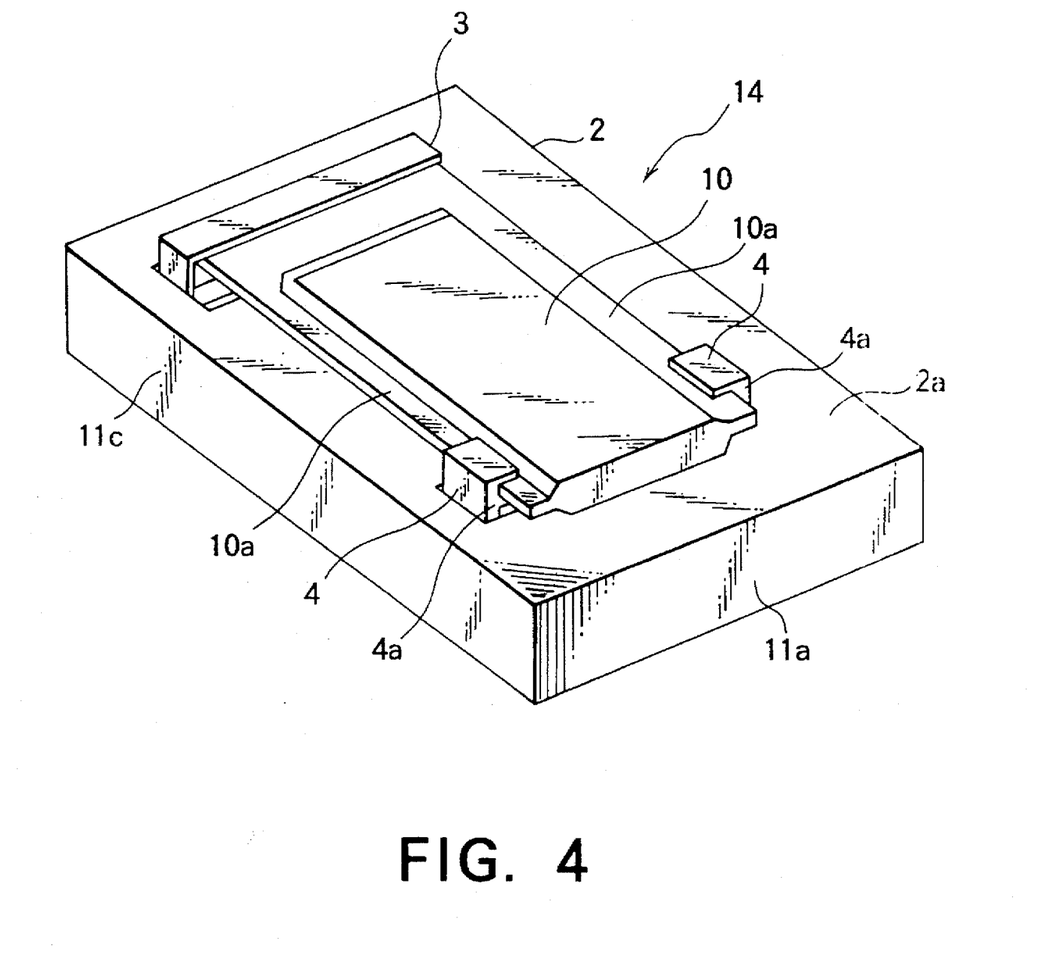
FIG. 4 is a perspective view of the portable information apparatus of FIG. 2 wherein the card is attached to the portable information apparatus.

As illustrated in FIG. 3, the card connector 1 is secured to the connector holding member 3 towards its opening surface which is exposed upon pulling up the connector holding member 3 to serve as a card insertion slot known in the art. The card connector 1 is adapted to be connected to a mating connector formed at a card end edge of the IC card 10 when the IC card 10 is received in the connector holding member 3 as illustrated in FIG. 4. The guide members 4 serve to hold and guide both of the card side edges 10a of the IC card 10.

In the case member 2, the top plate 12 has a plurality of apertures 12a and 12b through which the connector holding member 3 and the guide members 4 are movable, respectively. The top plate 12 is formed with a plurality of semicircular notches 5a and 5b adjacent to the apertures 12a and 12b, respectively. The semicircular notches 5a and 5b serve as finger traps for use in pulling up the connector holding member 3 and the guide members 4.

Referring to FIG. 5, a rotating structure of each of the connector holding member 3 and the guide members 4 will be described.

The connector holding member 3 is elastically deformed to insert the holding member axle potions 7a into the holding member axle receiving holes 6a, respectively. Each of the guide members 4 is elastically deformed to insert the guide member axle portions 7b into the holding member axle receiving holes 6b, respectively.

The holding member restricting groove 9a is formed to have an arc shape. Each of the guide member restricting grooves 9b is formed to have an arc shape. These grooves 9a and 9b are depressed at their both ends and adapted to be engaged with the protrusions 8a and 8b. Each of the grooves 9a will be referred to as a holding member restricting arrangement. Each of the grooves 9b will be referred to as a guide member restricting arrangement.

In order to pull up the connector holding member 3 and the guide members 4, the protrusions 8a and 8b are guided along the grooves 9a and 9b from the inner depressed end to the outer depressed end. With this structure, a strong force is required to remove the protrusions 8a and 8b from the depressed ends to the remaining portions of the grooves 9a and 9b. As a result, reliable engagement is assured between the protrusions 8a and 8b and the grooves 9a and 9b when the connector holding member 3 and the guide members 4 are received inside and pulled up. Thus, the connector holding member 3 and the guide members 4 are prevented from being undesiredly rotated and shifted.

Figure 6:
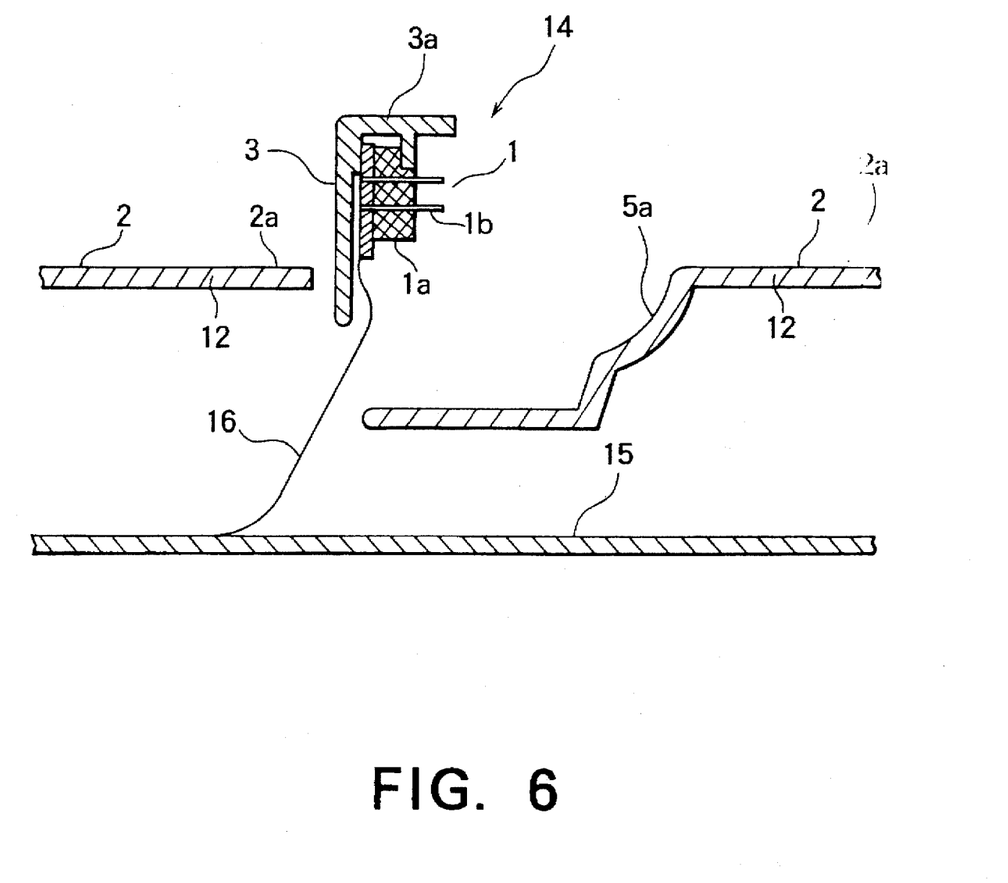
FIG. 6 is a sectional end view taken along a line VI—VI in FIG. 3.

Referring to FIG. 6, the description will proceed further. The card connector 1 comprises an insulation housing 1a and a plurality of conductive contact elements 1b. The insulation housing 1a is held to the connector holding member 3. Each of the conductive contact elements 1b is held to the insulation housing 1a.

The portable information terminal 14 further comprises a printed circuit board which is held to the case member 2 and will presently be described.

The printed circuit board comprises a hard board 15 and a flexible board 16. The hard board 15 is fixed to the case member 2 and has an electric circuit. The flexible board 16 is connected between the hard board 15 and the card connector 1 and is for electrically connecting the electric circuit to the conductive contact elements 1b of the card connector 1.

Next, description will proceed to an operation of the portable information terminal 14 when the IC card 10 is attached thereto.

FIG. 2 shows a first state where the connector holding member 3 and the guide members 4 are laid down. FIG. 3 shows a second state where the connector holding member 3 and the guide members 4 are pulled up. FIG. 4 shows a third state where the IC card 10 is attached to the portable information terminal 14.

Referring to FIG. 2, a user's finger is engaged with each of the notches 5a and 5b to rotate by 90 degrees and pull up each of the connector holding member 3 and the IC card guide members 4. FIG. 3 shows the state after the connector holding member 3 and the guide members 4 are rotated and pulled up. Then, the both ends of the IC card 10 are held by the guide members 4. The mating connector formed at the top end of the IC card 10 is connected to the IC card connector 1 inside the connector holding member 3. Thus, the IC card 10 is attached as shown in FIG. 4.

As described above, the connector holding member 3 and the guide members 4 are protruded outside of the case member 2 only when the IC card 10 is used. Therefore, although the IC card 10 is attachable, the space reserved as the IC card receiving space in the conventional portable information terminal 111 can be saved. Thus, it is possible to make the portable information terminal 14 smaller in size and thinner in thickness.

While the present invention has thus far been described in connection with a few embodiments thereof, it will readily be possible for those skilled in the art to put this invention into practice in various other manners. For example, a pair of supplementary guide members may be provided to the case member 2 to guide the card 10 in cooperation with the guide members 4. It is preferable that the supplementary guide members are similar to the guide members 4 in its structure, respectively.

What is claimed is:

1. A portable information apparatus comprising:
    a case member having a top plate;
    a card connector for connecting a card which is placed parallel to said top plate and on an upper surface of said top plate for expanding functions of said portable information apparatus;
    a connector holding member connected to said case member for holding said card connector, said connector holding member being movable between a position below said top plate and a position above said top plate; and
    card guiding means connected to said case member for guiding said card in parallel to said top plate, said card guiding means being movable between a position below said top plate and a position above said top plate.

2. A portable information apparatus as claimed in claim 1, wherein said connector holding member is movable around a first axis which is parallel to said top plate.

3. A portable information apparatus as claimed in claim 2, wherein said connector holding member comprises:
    a holding body for receiving said card connector;
    a holding member axle portion extending from said holding body along said first axis; and
    a holding member protrusion protruded from said holding body in parallel to said holding member axle portion, and wherein said case member comprises:
    a first wall surface adjacent to said holding body;
    holding member axle receiving means in said first wall surface for receiving said holding member axle portion; and
    holding member restricting means in said first wall surface for restricting movement of said holding member protrusion.

4. A portable information apparatus as claimed in claim 1, further comprising a card having a pair of card edges opposite to each other, and wherein said card guiding means comprises a pair of guide members which are connected to said case member for guiding said card edges, respectively.

5. A portable information apparatus as claimed in claim 4, wherein each of said guide members is movable around a second axis which is parallel to said top plate.

6. A portable information apparatus as claimed in claim 4, wherein each of said guide members comprises:
    a receiving body for receiving said card;
    a guide member axle portion extending from said receiving body along said second axis; and
    a guide member protrusion protruded from said receiving body in parallel to an axis of said guide member axle portion, said case member comprising:
    a second wall surface adjacent to each of said guide members;
    guide member axle receiving means in said second wall surface for receiving said guide member axle portion; and
    guide member restricting means in said second wall surface for restricting movement of said guide member protrusion.

7. A portable information apparatus as claimed in claim 6, wherein said receiving body has an insertion groove for receiving one of said card edges to guide said card in parallel to said top plate.

8. A portable information apparatus as claimed in claim 1, further comprising a printed circuit board which is connected to said case member and has an electric circuit, wherein said card connector comprises:
    an insulation housing connected to said connector holding member; and
    a conductive contact element connected to said insulation housing and electrically connected to said electric circuit.

9. A portable information apparatus as claimed in claim 8, wherein said printed circuit board comprises:
    a hard board fixed to said case member; and
    a flexible board connected between said hard board and said card connector.

10. A portable information apparatus as claimed in claim 1, wherein said top plate has a plurality of apertures through which said connector holding member and said card guiding means are movable, respectively.

11. A portable information apparatus as claimed in claim 10, wherein said top plate has a plurality of notches which are adjacent to said apertures, respectively.

12. A portable information apparatus comprising:

a case member comprising a top plate and a bottom plate forming opposite sides of the case member and a plurality of side plates each connected to the top and bottom plates;

a card connector for connecting said case member to a card which is placed parallel to said top plate;

a plurality of guide members movable between an exterior side and an interior side of a cavity defined by said top plate, said bottom plate and said plurality of side plates, said plurality of guide members being connected to the case member for guiding said card along the exterior side of the cavity and parallel to the top plate; and a connector holding member attached to the case member and the card connector, said connector holding member comprising:

a holding body for receiving and holding the card connector;

a plurality of holding member axle portions extending from opposite ends of the holding body along an axis parallel with said top plate in a first direction; and a plurality of holding member protrusions protruding from said opposite ends of the holding body in parallel to each of the holding member axle portions;

wherein the case member further comprises:

a first aperture in the top plate;

a plurality of second apertures in the top plate;

a pair of first wall surfaces located in the first aperture and disposed on opposite sides of the first aperture;

a holding member axle receiving hole on each of the first wall surfaces; and a holding member restricting groove located on each of the first wall surfaces.

13. A portable information apparatus as claimed in claim 12, wherein the connector holding member is contained within the first aperture in the top plate, wherein the guide members are contained within the plurality of second apertures in the top plate when the connector is not connecting a card to the case member, and wherein the connector holding member and the guide members are extended from the interior of the cavity when the connector is connecting a card to the case member.

14. A portable information apparatus as claimed in claim 12, further comprising:

a first notch adjacent to said first aperture in the top plate; and a plurality of second notches respectively adjacent to said second apertures in the top plate.

15. A portable information apparatus as claimed in claim 12, wherein said holding member restricting groove has an arc shape.

* * * * *